(12) United States Patent
Longoria et al.

(10) Patent No.: US 6,520,734 B2
(45) Date of Patent: *Feb. 18, 2003

(54) CONVERTIBLE TORTILLA COUNTER-STACKER

(75) Inventors: Jose L. Longoria, Plainview, TX (US); Steven M. Kenison, Plainview, TX (US)

(73) Assignee: ITE, Inc., Plainview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/681,749

(22) Filed: May 31, 2001

(65) Prior Publication Data

US 2001/0043859 A1 Nov. 22, 2001

(51) Int. Cl.[7] .............................................. B65G 57/02
(52) U.S. Cl. ..................... 414/790; 414/790.6; 414/900
(58) Field of Search ............................... 414/790.8, 790, 414/790.1, 788.1, 900

(56) References Cited

U.S. PATENT DOCUMENTS

| | | | | |
|---|---|---|---|---|
| 4,530,632 A | * | 7/1985 | Sela | 198/493 |
| 6,053,695 A | * | 4/2000 | Longoria et al. | 414/88.9 |
| 6,146,084 A | * | 11/2000 | Doyle | 414/788.9 |
| 6,168,370 B1 | * | 1/2001 | Longoria et al. | 271/197 |

* cited by examiner

Primary Examiner—Kathy Matecki
Assistant Examiner—Michael J. Kwon
(74) Attorney, Agent, or Firm—Daniel V. Thompson

(57) ABSTRACT

A tortilla stacker has stacker and lift subassemblies that may be logically programmed for simultaneous operation in differing configurations of tortilla numbers and sizes.

4 Claims, 8 Drawing Sheets

CONVERTIBLE TORTILLA COUNTER-STACKER

BACKGROUND OF INVENTION

This invention is related to food handling, apparatus, and more particularly to an improved device for counting and stacking thin, flexible food items such as tortillas.

The state of the art in tortilla stackers is the stacker previously patented by Jose L. Longoria and Steven M. Kenison in U.S. Pat. No. 6,053,695 entitled "TORTILLA COUNTER-STACKER." In that patent, a device is described with sequenced elevator lifts and stackers for making perfectly aligned stacks without manual tapping, ready for bagging.

The discussion of other prior art in U.S. Pat. No. 6,053,695 is incorporated herein by reference.

A drawback of prior stackers, including that of U.S. Pat. No. 6,053,695, is that the numbers of rows and the sizes of tortillas that can be accommodated by the machine are fixed, be it 2, 3, 4 or more rows of a given diameter. While a fixed-row, fixed size stacker is desirable in some instances due to simplicity and cost of manufacture, there are many instances where it is desirable to have the flexibility to quickly change or convert between row configurations and/or sizes of tortillas. Moreover, it is important that any change over procedure be simple and fool-proof, without requiring advanced mechanical skills, in order that production line workers may make the change overs without special skills, tools or training.

SUMMARY OF INVENTION

This invention provides a tortilla stacker that is readily convertible between numbers of rows and sizes of tortillas, in an improved tortilla stacker where tortillas are evenly stacked and the stacks are transported to a bagging station substantially ready to be bagged. The present invention describes and claims novel elements such as a stacker and lift subassemblies that may be logically programmed for simultaneous operation in differing configurations of tortilla numbers and sizes, which are an improvement of the art making the invention more commercially viable.

The types of problems encountered in the prior art are inflexibility of tortilla configurations.

In the prior art, unsuccessful attempts to solve this problem were attempted namely: manually adjustable lift and stacker configurations. However, the problem was solved by the present invention because of the programmable stacker and lift subassemblies.

Innovations within the prior art are rapidly being exploited in the field of automated food preparation.

The present invention went contrary to the teaching of the art which teaches manual reconfiguration of the numbers of tortilla rows and tortilla sizes.

The present invention solved a long felt need for a fully automated tortilla counting and stacking apparatus.

The present invention produced unexpected results namely: the efficiency of tortilla packaging was greatly enhanced.

A synergistic effect was produced utilizing the present invention due to the following facts and results from experimentation: the cost of manufacture was reduced due to ready flexibility in configuration of the tortilla stacker.

Accordingly, it is an object of the present invention to provide a tortilla stacker having stacker and lift subassemblies that may be logically programmed for simultaneous operation in differing configurations of numbers of tortilla rows and tortilla sizes.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

DETAILED DESCRIPTION

The disclosure of U.S. Pat. No. 6,053,695 is incorporated herein by reference.

Figure 1:
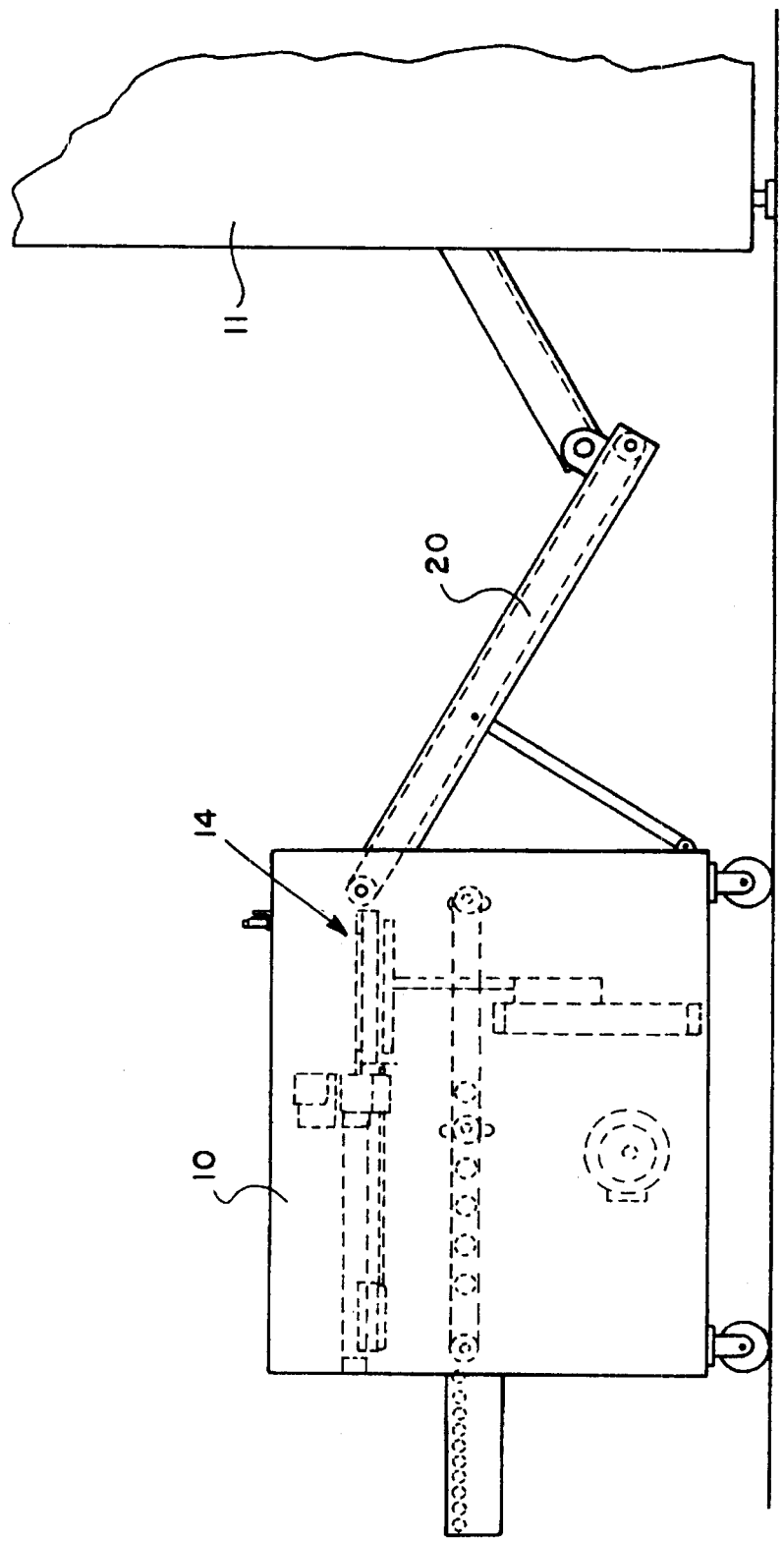
FIG. 1 is a schematic view of a tortilla stacker (10).

Referring initially to FIG. 1, a stacker (10) is located at the exit end of a cooling conveyor (11). Finished and cooled tortillas exit the cooling conveyor (11) in multiple rows transverse to the direction of flow through the cooling conveyor (11). The present invention provides a stacker (10) that is readily convertible between configurations of 2, 3, and 4 rows of tortillas, as it is common in the tortilla industry to provide forming and baking equipment upstream of the stacker that is convertible in this fashion. While the specific embodiment of stacker (10) described herein has 2, 3, and 4 rows, it will be understood that there are numerous additional and alternate configurations that can be accomplished by routine experimentation, and no upper limit to number of rows of tortillas that can be configured.

Figure 2:
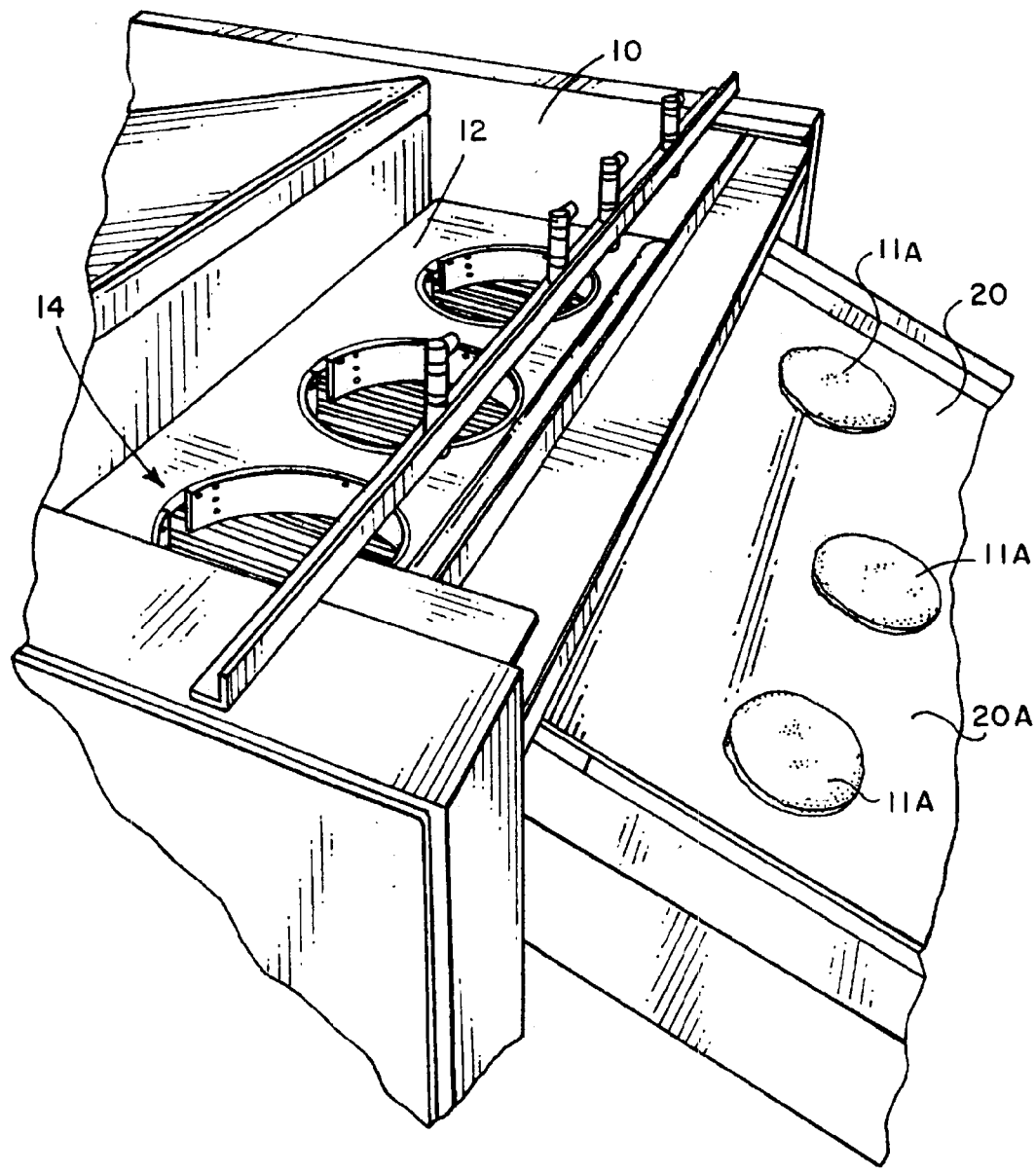
FIG. 2 is an upper front left perspective view of a tortilla stacker (10) exhibiting a canister assembly (12).

As shown in FIG. 2, an upper conveyor (20) is horizontally positioned in alignment with a canister assembly location (14). The upper conveyor (20) includes a rotatable upper conveyor belt (20A) upon which incoming tortillas (11A) are placed by cooling conveyor (11).

Figure 3:
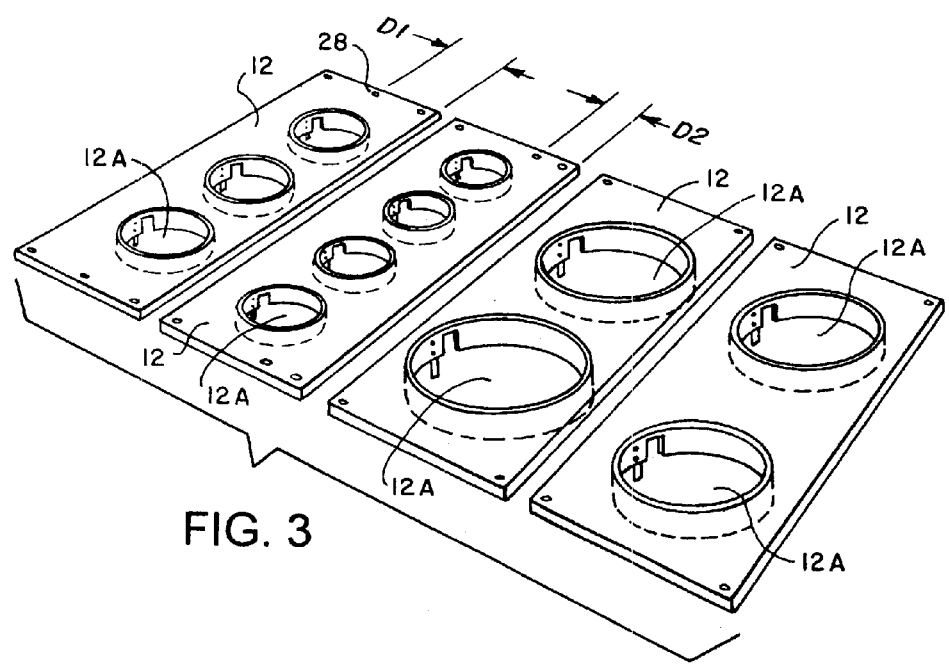
FIG. 3 is an upper perspective view canister assemblies (12).
Figure 4:
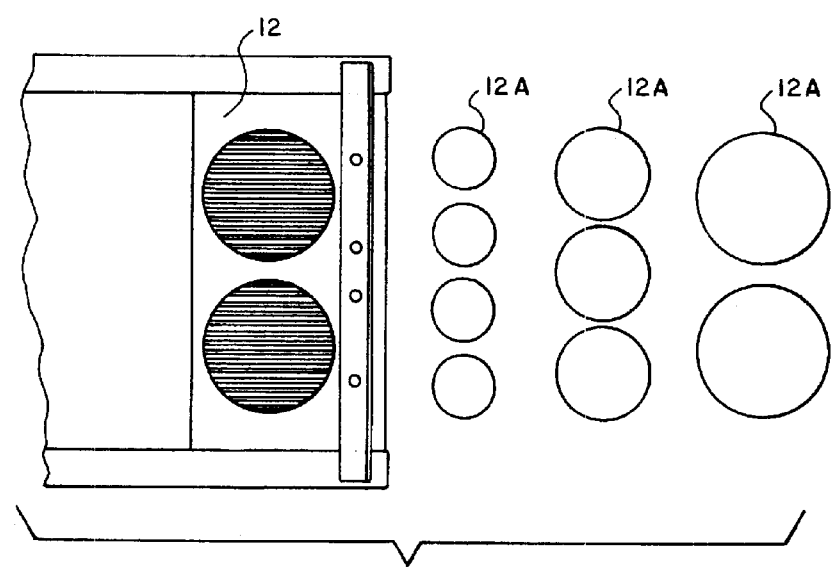
FIG. 4 is a partial plan view exhibiting differing configurations.
Figure 5:
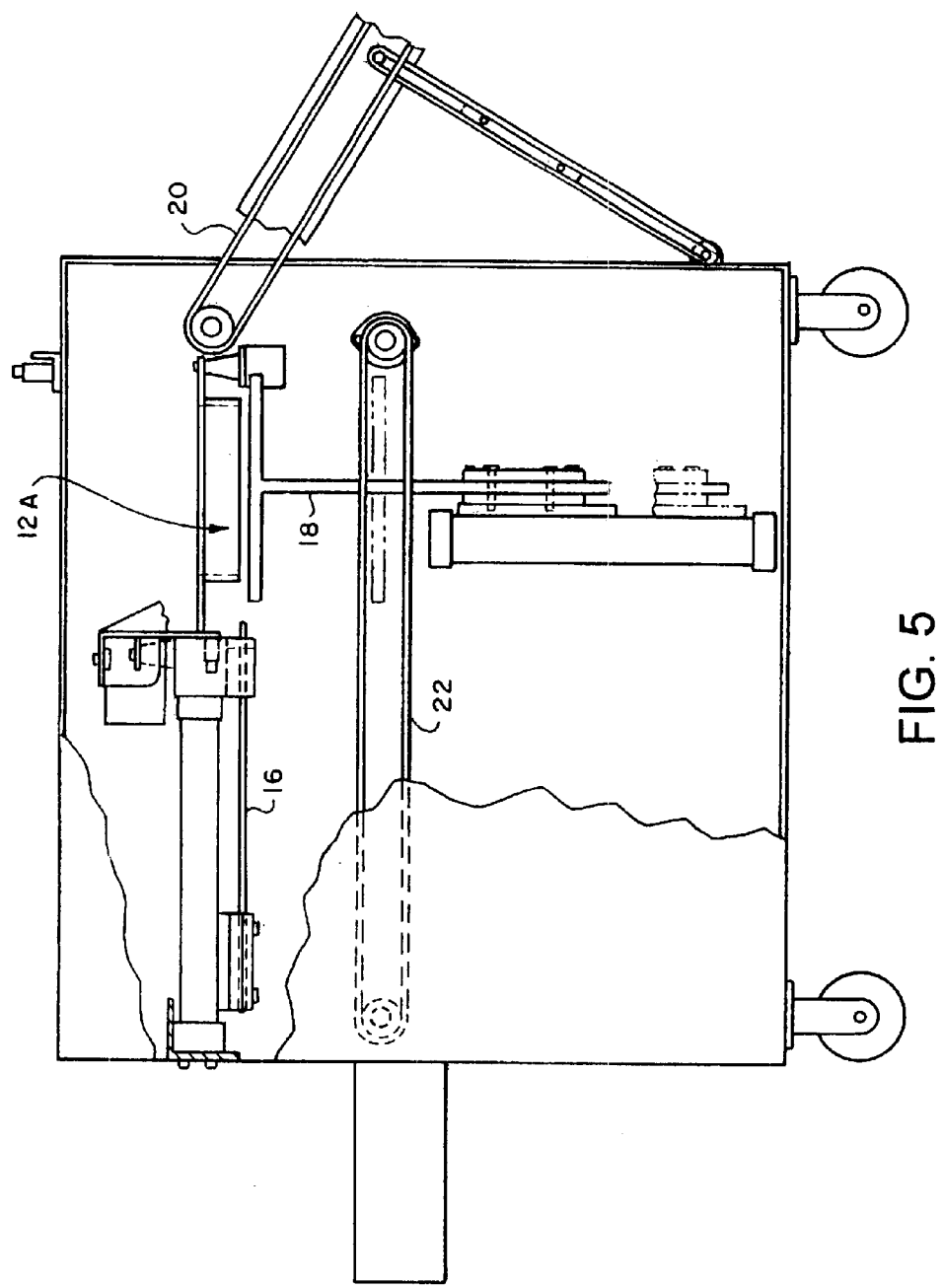
FIG. 5 is a partially broken away side view of a tortilla stacker (10) exhibiting a raised lift (18) and a stacker (16) in a fully retracted position.

As shown in FIGS. 3 AND 4 stacker (10) includes a plurality of interchangeable canister assemblies (12), each of the canister assembles having a unique combination of number and sizes of canister openings (12A), that the canister assemblies (12) adapted and arranged to be interchangeably installed in the stacker (10) at the canister assembly location (14) adjacent the upper conveyor (20). As best shown in FIG. 3, the three-row canister assembly (12)

includes a configuration indicator aperture (28) located a distance D1 from an edge of canister assembly (12). The four-row canister assembly (12) includes a configuration indicator aperture (28) located a distance D2 from an edge of canister assembly (12). The two-row canister assemblies (12) include no apertures corresponding to those on the three- and four-row canister assemblies (12), and are solid at those locations.

Referring now to FIGS. 5–8, stacker (10) includes plurality of stackers (16). Each stacker (16) includes at least one of a plurality of stacker subassemblies (16A) positioned adjacent to the canister assembly location (14). Each stacker subassembly includes a stacker cylinder (16AA) having a movable stacker cylinder head (16AAA) attached to a rear distal end of a horizontal stacker plate (16B) which inserts and retracts beneath the canister assembly location (14).

Similarly, a plurality of lifts (18) are provided. Each lift (18) includes at least one of a plurality of lift subassemblies (18A) positioned directly below the canister assembly location (14). Each lift subassembly (18A) includes a lift cylinder (18AA) having a movable lift cylinder head (18AAA) attached to a lower distal end of a horizontal lift plate (18B) which raises and lowers beneath the canister assembly location (14).

A lower conveyor (22) is positioned between the lift subassemblies (18) and the canister assembly location (14). The lower conveyor (22) comprises at least one lower conveyor belt (22A). The lower conveyor (22) is adapted and arranged to permit the horizontal lift plate (18B) to deposit a tortilla stack on the lower conveyor belt (22).

Figure 9:
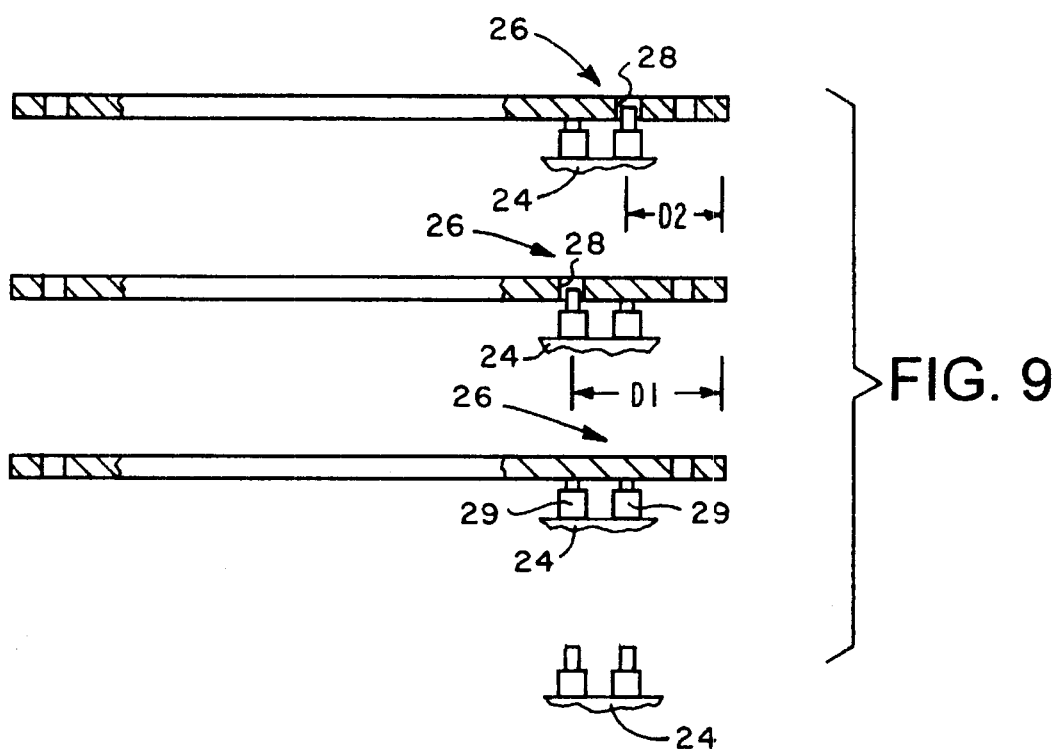
FIG. 9 is a view of the configuration indicators (26) of the canister assemblies (12) and configuration sensor (24) of one embodiment of a tortilla stacker (10) constructed in accordance with the invention.

As best shown in FIG. 9, a configuration sensor (24) is provided for controlling the stacker subassemblies (16A) and lift subassemblies (18A). The configuration sensor (24) is adapted to program simultaneous operation of certain ones of the stacker subassemblies (16A) and lift subassemblies (18A) in order to configure the stackers (16) and lifts (18) to a configuration of a canister assembly (12) installed in the canister assembly location (14).

Figure 6:
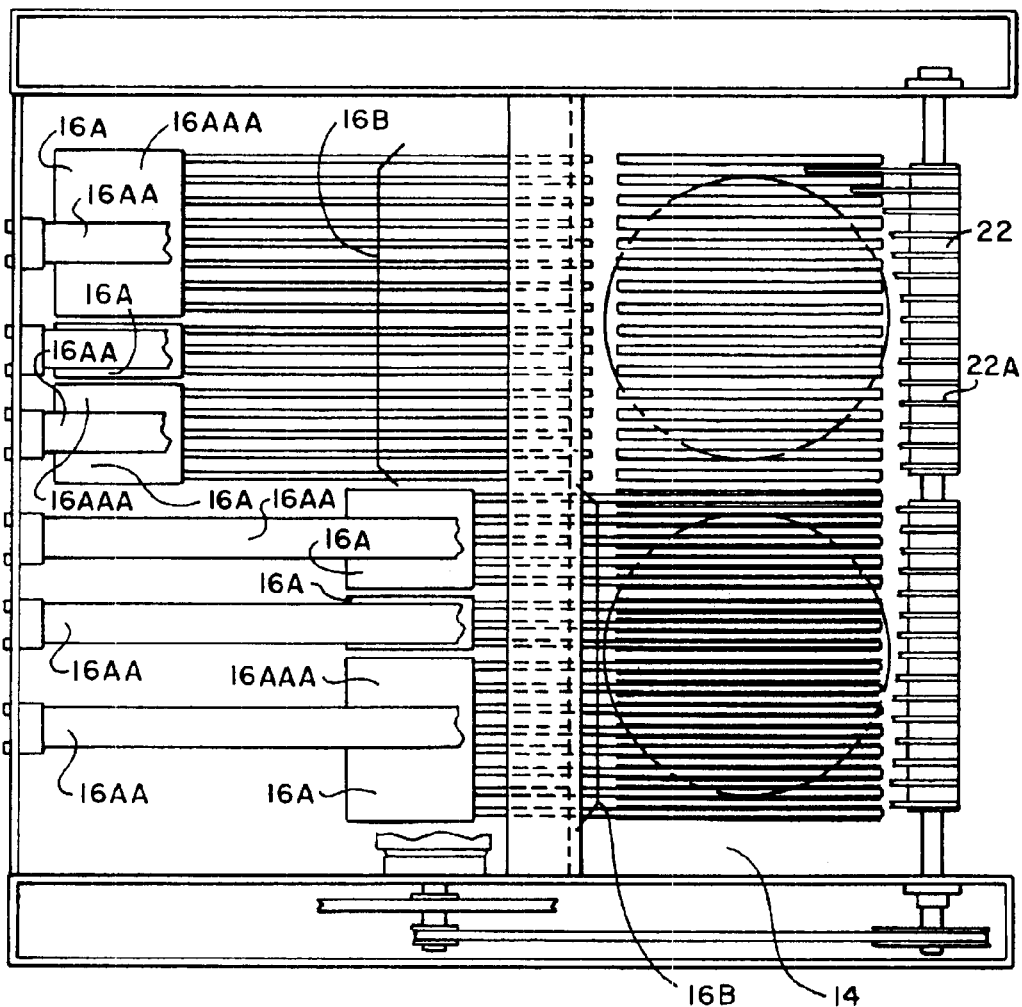
FIG. 6 is a partial plan view of a tortilla stacker (10).
Figure 7:
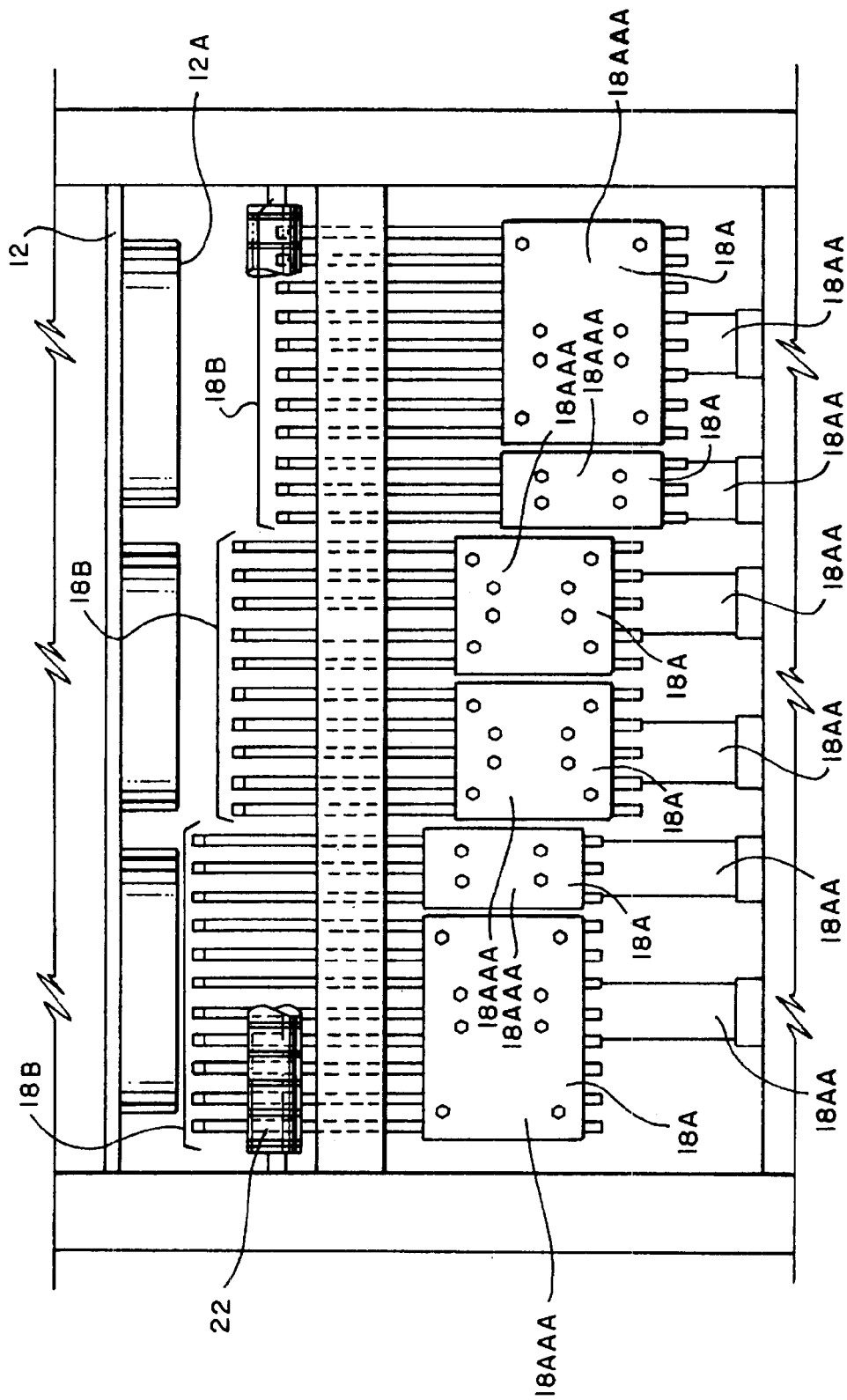
FIG. 7 is a partial front elevation view of a tortilla stacker (10) exhibiting lifts (18).
Figure 8:
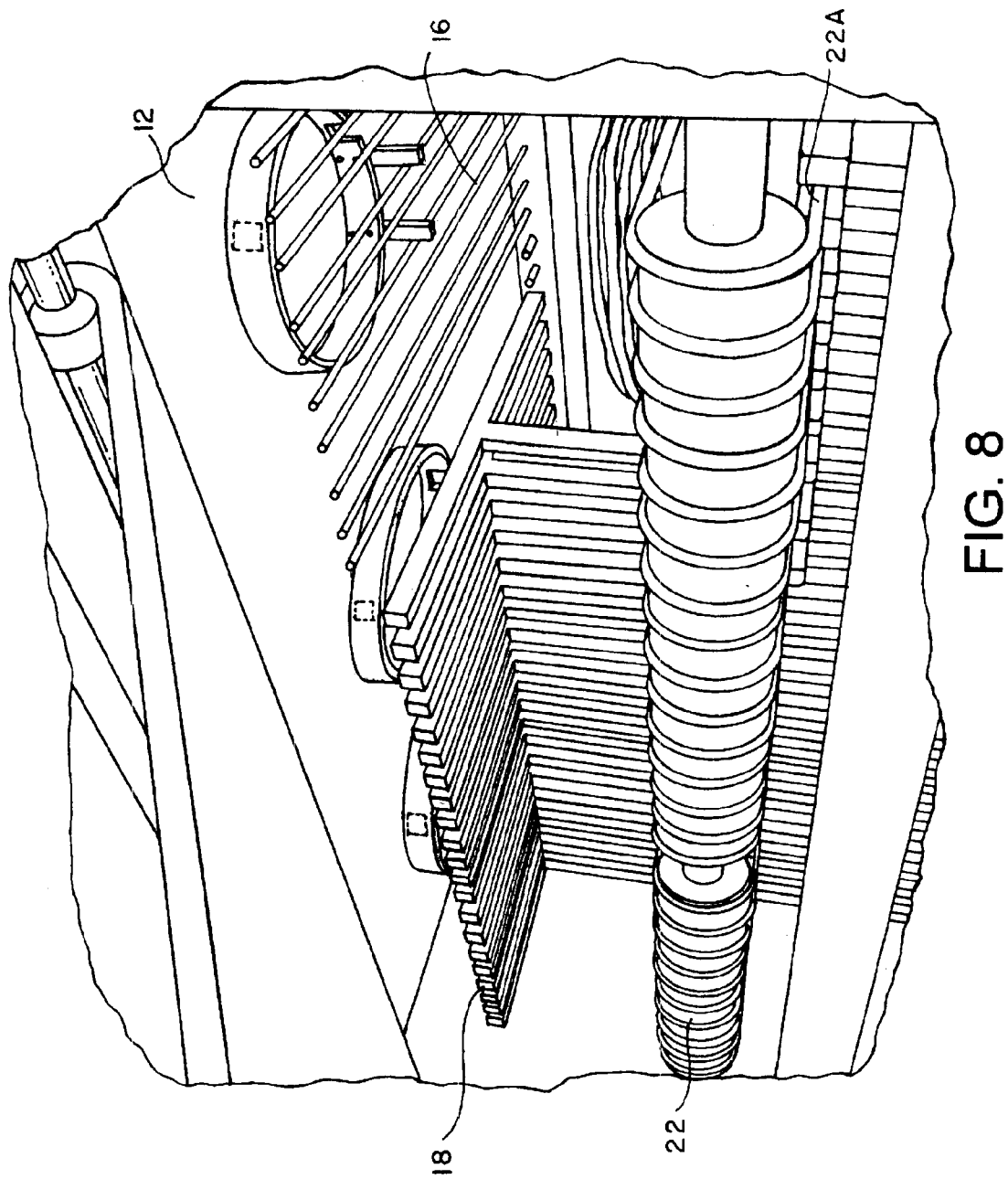
FIG. 8 is a lower front right perspective view of a tortilla stacker (10) exhibiting raised and lowered lifts (18) and stackers (16) in extended and fully retracted positions.

All drawings herein are to scale, and it will be apparent that the variance in width of different stacker and lift subassemblies enables them to accommodate different configurations when different combinations of the subassemblies are set to operate simultaneously. Thus, when as shown in FIG. 7 the subassemblies simultaneously operate as three pairs side by side, a three-row configuration is enabled. When as shown in FIG. 6 the subassemblies simultaneous operate as two groups-of-three, a two-row configuration is enabled. If the outer, wider subassemblies are set to operate alone, and the remaining inner subassemblies are set to simultaneously operate as two side-side pairs, a four-row configuration is enabled.

In the illustrated embodiment, configuration sensor (24) is composed of two push-button electrical switches (29), which electrically interface with an array of programmable logic controllers (not shown) for the stacker and lift cylinders in accordance with conventional programmable logic control principles applicable to pneumatic and hydraulic cylinders. Configuration sensor (24) is located at the canister assembly location (14).

A configuration indicator (26) is located at each canister assembly (12), such that the stackers (16) and lifts are configured for co-operation by the configuration indicator (26) of the canister assembly (12). The configuration indicator (26) of the three- and four-row canister assemblies (12) is the configuration indicator aperture (28) in the canister assembly (12). When only one of the switches (29) is closed it sets up one configuration (for example a four-row configuration), and when only the other switch (29) is closed another configuration (for example the four-row configuration). When both switches are closed, yet another configuration, such as the two-row configuration, is selected. When both switches are open, the machine senses that there is no canister assembly present and shuts down operation.

Thus it can be seen that the stacker of the present invention can be converted between configurations merely be selecting the desired canister assembly. Equivalent function could be obtained by having the configuration sensor (24) be a manually operated switch or a logic controller keyboard entry.

Whereas, the present invention has been described with respect to a specific embodiment thereof, it will be understood that various changes and modifications will be suggested to one skilled in the art, and it is intended to encompass such changes and modifications as fall within the scope of the appended claim.

It will be understood that each of the elements described above, or two or more together, may also find a useful application in other types of constructions differing from the type described above.

While the invention has been illustrated and described as embodied in a Tortilla Stacker, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A tortilla stacker (10), comprising:

A) a plurality of interchangeable canister assemblies (12), each of the canister assemblies having a unique combination of number and size of canister openings (12A), with the canister assemblies (12) adapted and arranged to be interchangeably installed in the stacker (10) at a canister assembly location (14) adjacent an upper conveyor (20);

B) a plurality of stackers (16), each stacker (16) comprising at least one of a plurality of stacker subassemblies (16A) positioned adjacent to the canister assembly location (14), each stacker subassembly comprising a stacker cylinder (16AA) having a movable stacker cylinder head (16AAA) attached to a rear distal end of a horizontal stacker plate (16B) which inserts and retracts beneath the canister assembly location (14);

C) a plurality of lifts (18), each lift (18) comprising at least one of a plurality of lift subassemblies (18A) positioned directly below the canister assembly location (14), each lift subassembly (18A) comprising a lift cylinder (18AA) having a movable lift cylinder head (18AAA) attached to a lower distal end of a horizontal lift plate (18B) which raises and lowers beneath the canister assembly location (14);

D) an upper conveyor (20) horizontally positioned in alignment with the canister assembly location (12A), the upper conveyor (20) comprising a rotatable upper conveyor belt (20A) upon which incoming tortillas are placed;

E) a lower conveyor (22) positioned between the lift subassemblies (18) and the canister assembly location (14), the lower conveyor (22) comprising at least one lower conveyor (22A), the lower conveyor (22) adapted and arranged to permit the horizontal lift plate (18B) to deposit a tortilla stack on the lower conveyor (22); and F) a configuration sensor (24) controlling the stacker subassemblies (16A) and lift subassemblies (18A), the configuration sensor (24) adapted to program simultaneous operation of certain ones of the stacker subassemblies (16A) and lift subassemblies (18A) in order to configure the stackers (16) and lifts (18) to a configuration of a canister assembly (12) installed in the canister assembly location (14).

2. The tortilla stacker (10) as described in claim 1, with the configuration sensor (24) at the canister assembly location (14).

3. The tortilla stacker (10) as described in claim 2, with a configuration indicator (26) at each canister assembly (12), such that the stackers (16) and lifts are configured for co-operation by the configuration indicator (26) of the canister assembly (12).

4. The tortilla stacker (10) as described in claim 3, with the configuration indicator (26) of at least one canister assembly (12) being a configuration indicator aperture (28) in the canister assembly (12), and the configuration sensor (24) being an electrical switch (29) engaged with the configuration indicator aperture (28).

* * * * *